(12) United States Patent
Thomas

(10) Patent No.: US 6,188,507 B1
(45) Date of Patent: Feb. 13, 2001

(54) VARIABLE ACOUSTO-OPTIC SPECTRUM PROJECTOR AND METHOD OF OPERATION

(75) Inventor: Matthew C. Thomas, Carpinteria, CA (US)

(73) Assignee: Mission Research Corporation, Santa Barbara, CA (US)

( * ) Notice: Under 35 U.S.C. 154(b), the term of this patent shall be extended for 0 days.

(21) Appl. No.: 09/270,543

(22) Filed: Mar. 17, 1999

(51) Int. Cl.⁷ .................................................. G02F 1/33
(52) U.S. Cl. ....................... 359/305; 359/311; 359/285; 359/287; 359/618; 348/754; 348/758; 356/345
(58) Field of Search ................................ 359/305, 308, 359/311, 312, 285, 558, 559, 563, 618, 310, 287; 348/754, 758, 760, 769; 356/345

(56) References Cited

U.S. PATENT DOCUMENTS

| | | | |
|---|---|---|---|
| 4,332,441 | * 6/1982 | Margolis | 359/311 |
| 4,443,066 | 4/1984 | Freyre . | |
| 4,620,104 | 10/1986 | Nordal et al. . | |
| 4,633,170 | 12/1986 | Burns . | |
| 4,649,529 | 3/1987 | Avicola . | |
| 4,652,817 | 3/1987 | Yarborough et al. . | |
| 4,720,747 | * 1/1988 | Crowley | 348/758 |
| 4,851,918 | * 7/1989 | Crowley | 348/754 |
| 4,962,382 | 10/1990 | Lee . | |
| 5,363,221 | * 11/1994 | Sutton et al. | 359/305 |
| 5,390,046 | * 2/1995 | Gesell et al. | 359/287 |
| 5,457,567 | * 10/1995 | Shinohara | 359/305 |
| 5,694,216 | * 12/1997 | Riza | 356/345 |
| 5,717,401 | 2/1998 | Sabet-Peyman et al. | 359/305 |
| 5,946,128 | * 8/1999 | Paek | 359/305 |

* cited by examiner

*Primary Examiner*—Loha Ben
(74) *Attorney, Agent, or Firm*—Trask Britt (57) ABSTRACT

A variable acousto-optic spectrum projector is disclosed. The invention may include a radiation source, an entrance slit, a lens or mirror, a Bragg cell, an arbitrary function generator for driving a transducer of the Bragg cell, another lens or mirror, an exit slit, and a collimating lens. In a first embodiment of the invention, the Bragg cell comprises a $Tl_3AsSe_3$ crystal and emits light in the 7 to 11 $\mu$m range (long-wave infrared) with a spectral resolution of between 4.5 and 7 $cm^{-1}$. In a second embodiment of the invention, the Bragg cell comprises a $TeO_2$ crystal and emits light in the 420 to 720 nm range (visible) with a spectral resolution of between 50 and 80 $cm^{-1}$.

40 Claims, 4 Drawing Sheets

VARIABLE ACOUSTO-OPTIC SPECTRUM PROJECTOR AND METHOD OF OPERATION

BACKGROUND OF THE INVENTION

1. Technical Field

This invention relates to spectrum projectors. More particularly, this invention relates to variable acousto-optic spectrum projectors where the intensity of different wavelengths of the projected radiation is controlled as a function of time.

2. State of the Art

All objects of non-zero absolute temperature emit thermal radiation. Spectral energy density $f(\lambda, T)$ is given by Planck's radiation law:

$$f(\lambda, T) = \frac{8\pi hc\lambda^{-5}}{(e^{hc/\lambda kT} - 1)}, \quad (1)$$

which is strictly valid for a blackbody, where $h=6.626\times10^{-34}$ J s (Planck's constant), $c=2.998\times10^8$ m/s (speed of light), $\lambda$ is wavelength, $k=1.381\times10^{-23}$ J/K (Boltzman constant), and T is absolute temperature. For bodies at room temperature ($T=300$ K), this yields a spectrum with a maximum intensity at approximately 10 $\mu$m wavelength in the middle infrared spectral range. If the temperature is increased, the spectral energy distribution will vary according to EQ. (1), and the wavelength at maximum intensity ($\lambda_{max}$) will be displaced towards shorter wavelengths. For $T=6000$ K, the temperature of the surface of the sun, $\lambda_{max}$ is in the visible range. This displacement of $\lambda_{max}$ as a function of temperature is approximated by Wein's displacement law:

$$\lambda_{max} \cdot T = \text{constant} = 2.898\times10^{-3} \text{m·s}, \quad (2)$$

which can be derived from EQ. (1). By integration over all radiation frequencies, one derives Stefan-Boltzmann's radiation law:

$$R = \sigma T^4, \quad (3)$$

where the total emittance, R, is the total energy of all wavelengths emitted per unit time and per unit area of the blackbody, T is the kelvin temperature, and $\sigma$ is the Stefan-Boltzmann constant, equal to $5.672\times10^{-8}$ W/m$^2$K$^4$. It should be noted that the total emittance for an outside surface of a body of an object is always somewhat less than R in EQ. (3), and is different for different materials. A good approximation of total emittance for non-blackbody objects is:

$$R = \epsilon\sigma T^4, \quad (4)$$

where $\epsilon<1$, and is termed the body's emissivity.

Electromagnetic radiation sources are used in products ranging from lights to X-ray machines. For example, in a conventional infrared spectrometer one will typically find a hot radiation source, an optical filter that selects a restricted spectral region from the continuum of radiation emitted by the source, a chamber containing a sample which is radiated, and a detector that measures radiation passed through the sample. Usually, the radiation sources of such spectrometers operate at a constant temperature $T_h$, which is much higher than the background, or ambient, temperature, $T_o$.

For many practical instruments it is useful to modulate the emitted radiation either spectrally, temporally, or both. One conventional method of creating pulsed radiation is to insert a rotating wheel (a chopper) furnished with equidistant apertures along the rim, into the radiation path to make the radiation pulsed. Pulsed radiation is particularly useful because many types of infrared detectors only respond to changes in radiation level. For example, pyroelectric detectors, used in applications of photoacoustic spectroscopy and related techniques, require pulsed radiation. Pulsed radiation is also advantageous in electronic amplification and noise discrimination.

A non-mechanical means of providing pulsed radiation is disclosed by Nordal et al. in U.S. Pat. No. 4,620,104. In Nordal et al., thick film resistors mounted on ceramic substrates are electrically heated with pulsed current to generate pulsed infrared radiation without the use of mechanically moving parts.

Another means of modulating light is by using acousto-optical devices such as a Bragg cell. The operation of a Bragg cell is described briefly as follows. A Bragg cell is generally formed of a block of a crystalline material with a piezoelectric transducer bonded to an end or side of the block and is tuned to a frequency band suitable for the particular crystalline material of interest. The terms "piezoelectric transducer" and "transducer" will be used interchangeably hereinafter. When the transducer is excited with an electrical signal, a traveling acoustic wave is set up in the cell. This causes slight changes in the refractive index of the cell material between the peaks and valleys of the acoustic pressure wave. When light is introduced at the correct angle, termed the Bragg angle, the refractions from the index changes add in phase, and Bragg diffraction takes place. A portion of the input light beam is deflected and can be imaged onto a screen, photodetector or other device. The power of the deflected beam is proportional to the amplitude (power) of the acoustic input and the deflection angle is proportional to the frequency of the acoustic input.

The operation of a Bragg cell as an acousto-optic deflector or diffraction grating is described in greater detail as follows. A radio-frequency (RF) signal of center frequency $f_c$ and bandwidth $\Delta f$ is applied to the piezoelectric transducer along a surface of the Bragg cell crystal. The RF signal causes the transducer to expand and contract with the RF signal frequency $f$ causing pressure waves to propagate down the width of the crystal. The wavelength of the acoustic pressure waves, $\Lambda$, equals $v/f$, where v is the acoustic velocity (measured typically in mm/$\mu$s) of the crystal. The length of the crystal in the optical propagation direction is L. The width of the crystal, W, corresponds to the propagation distance of the acoustic waves and the width of the optical aperture. The height of the crystal, H, corresponds to the height of the optical aperture and sound field. The diameter of the optical input beam is D, where $D \approx W$.

For maximum efficiency, the input light angle relative to the acoustic wavefronts in the crystal is restricted by the Bragg condition:

$$K_o = K_i + K_a, \quad (5)$$

where K is the vector wavenumber with magnitude $2\pi/\lambda$ (or $2\pi/\Lambda$ for $K_a$), and subscripts "o", "i" and "a" are indicative of "out", "in" and "acoustic", respectively. This means $$\theta_{B,i} \approx \sin\theta_{B,i} = \frac{\lambda_i}{2\Lambda}, \quad (6)$$

where $\lambda$ is the optical wavelength and $\theta_{B,i}$ is the input Bragg angle measured from the Bragg cell's normal.

Assuming the Bragg condition (EQ. 5) is met, the diffraction efficiency, $\eta$, is equal to:

$$\eta = \sin^2\left(\frac{\pi}{\lambda}(M_2 PL/2H)^{1/2}\right), \quad (7)$$

where P is the RF power, and $M_2$ in the Bragg cell crystal material's modulation figure of merit in units of area per power. The diffraction efficiency, $\eta$, is maximum when:

$$P = \frac{H\lambda^2}{2LM_2}, \quad (8)$$

The diffracted optical power at each wavelength is proportional to the RF power, P, at the corresponding frequency. However, too much power will lower the efficiency due to the $\sin^2$ function. The absolute diffracted optical power is controlled primarily by the brightness of the source.

The diffraction (deflection) angle in air, $\theta_o$, relative to the input angle in the Bragg condition, is equal to:

$$\theta_0 = 2\theta_B = \frac{\lambda}{\Lambda} = \frac{\lambda f}{v}, \quad (9)$$

This means that different frequencies, as well as different wavelengths, are deflected to different angles. The maximum deflection angle, $\theta_{max}$, is determined by the wavelength, $\lambda$, transducer frequency bandwidth, $\Delta f$, and center frequency, $f_c$:

$$\theta_{max} = \frac{\lambda(\Delta f/2 + f_c)}{v}, \quad (10)$$

The maximum number of resolvable angles, N, for ideal spots separated by $\lambda/W$, is equal to:

$$N = \frac{\Delta\theta W}{\lambda} = \frac{(\theta_{max} - \theta_{min})W}{\lambda} = \frac{\Delta f W}{v}, \quad (11)$$

For real systems, which must satisfy Rayleigh's criterion, EQ. (11) is expressed as:

$$N = \frac{W\Delta f}{1.22v} = \frac{\Delta\theta W}{1.22\lambda}, \quad (12)$$

Thus, to satisfy Rayleigh's criterion, spots must be separated by angles of:

$$\delta\theta = \frac{1.22\lambda}{W} = \frac{\Delta\lambda f}{vN} = \frac{\delta\lambda f}{v}, \quad (13)$$

since $\Delta f/f = \Delta\lambda/\lambda$. The average angular resolution, $\delta\theta_{avg}$, equals $\Delta\theta/N$. Thus, maximizing the resolution of an optical system with a Bragg cell by minimizing the spot separation requires a material with a slow acoustic velocity, a transducer with a large frequency bandwidth, and a large optical beam diameter (crystal width). From EQ. 8, the efficiency of the deflected light is proportional to L/H. Therefore, the efficiency increases with L while the resolution improves with larger $\Delta f$ and smaller v. Furthermore, the deflection angle increased with $\lambda$ as well as with large $f$ and small v.

Bragg cells have been used in a number different applications, for example: spectrum analyzers, as in U.S. Pat. No. 4,633,170 to Burns; optical signal processors, as in U.S. Pat. No. 4,962,382 to Lee; active recognition systems, as in U.S. Pat. No. 5,717,401 to Sabet-Peyman et al.; chip rate detectors, as in U.S. Pat. No. 4,652,817 to Yarborough et al.; beam shifters, as in U.S. Pat. No. 4,443,066 to Freyre; and multi-channel fiber optic sensor systems, as in U.S. Pat. No. 4,649,529 to Avicola. However, in none of these references is a Bragg cell combined with a broadband light source to create a spectrum projector with arbitrarily time variable and spectrally variable output. Furthermore, none of the apparatuses disclosed in these references appear to be able to project arbitrary time-varying spectra, or to simulate the emission or absorption spectra of chemical and biological agents. Thus, there is a need in the art for a variable acousto-optic spectrum projector.

SUMMARY OF THE INVENTION

The present invention includes a variable acousto-optic spectrum projector (VAOSP) and methods of operation. The VAOSP is superior to conventional lamps and lasers in that the intensity of different wavelengths can be controlled as a function of time. For instance, one embodiment of a VAOSP is capable of outputting a spectrum that can shift from that of a mercury lamp to a potassium lamp in less than a millisecond. A VAOSP may also be used to project simulated chemical emission or absorption spectra. A VAOSP may project simulated absorption spectra by nominally transmitting all wavelengths from the broadband light source equally with about the same radiance and adding light from a blackbody and finally reducing the radiance of certain lines.

An exemplary structure and operation of a VAOSP according to the invention is as follows. A continuous-wave broadband light source is placed behind an entrance slit. The light passing through the entrance slit is collimated by a lens or mirror and sent through an acousto-optic Bragg Cell located at the Fourier plane (one focal length, $L_F$, away from the lens or mirror). The Bragg Cell operates as a dynamic transmission grating when radio frequency (RF) signals are applied to its transducer. Depending on the source wavelengths, the crystal in the Bragg Cell, the RF frequency and the RF power, light rays at different wavelengths are diffracted towards an output lens or mirror at different angles and with different efficiencies. The output optical element is also in a telecentric orientation (i.e., at the Fourier plane, or one focal length, $L_F$, from the middle, i.e., near L/2, of the Bragg Cell), so light emerging from the Bragg Cell at different angles is focused to different lateral positions at the focal plane. When an exit slit is placed at the focal plane of the output element, the light passing through the slit is potentially composed of some or all of the wavelengths emitted by the source. When another collimating lens or mirror is positioned after the slit, a collimated source of time-varying, spectrally-varying light is created.

BRIEF DESCRIPTION OF THE FIGURES

In the drawings, which illustrate what is currently regarded as the best mode for carrying out the invention and which like reference numerals refer to like parts in different views or embodiments.

DETAILED DESCRIPTION OF THE INVENTION

The following detailed description discloses a variable acousto-optic spectrum projector (VAOSP) capable of projecting arbitrary time-varying or static spectra. The VAOSP can also simulate the emission or absorption spectra of chemical and biological agents.

Figure 1:
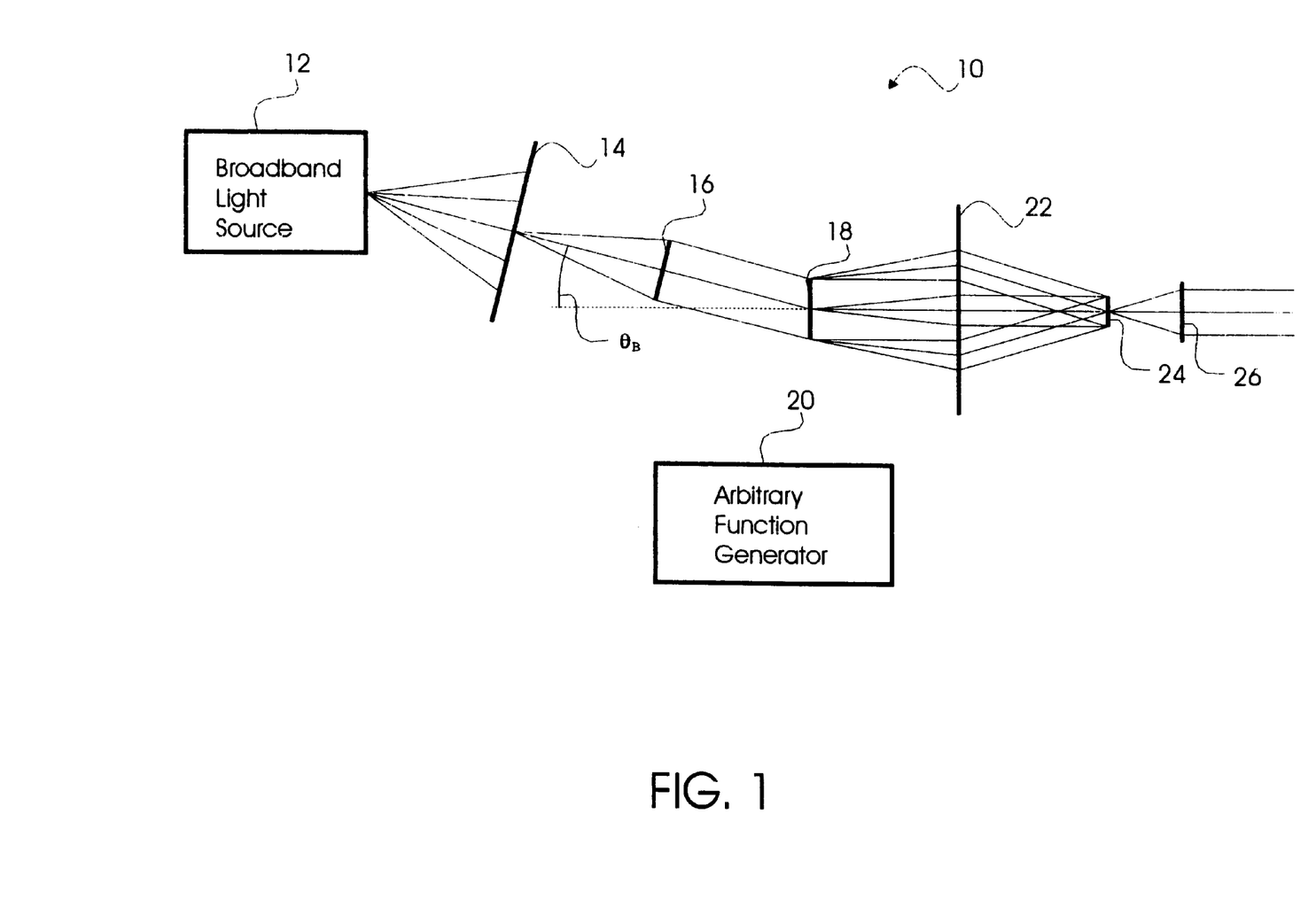
FIG. 1 is a ray diagram of a variable acousto-optic spectrum projector in accordance with this invention.

Referring to FIG. 1, a ray trace diagram of a generic VAOSP 10 in accordance with this invention is shown. The generic VAOSP 10, as illustrated in FIG. 1, includes eight components. The first component is a radiation source 12. The radiation source 12 may be continuous-wave or pulsed broadband light source 12. The terms "radiation source", "continuous-wave light source", "pulsed broadband light source" and "broadband light source" will be used interchangeably hereinafter. In an IR embodiment of a VAOSP, the radiation source 12 may be a hot blackbody which radiates electromagnetic energy over a relatively broad range of frequencies. A high temperature blackbody (T>400 K), has reasonable spectral emission from about 3–12 $\mu$m. Raising the temperature of the blackbody raises the power at all wavelengths in the spectral band emitted by the blackbody. It is preferable that the emissivity of a blackbody used in an infrared embodiment of a VAOSP be greater than 90% at all wavelengths of the VAOSP output. In a visible embodiment of a VACOSP, the radiation source 12 may be a visible lamp such as, for example and not by way of limitation, a high-power xenon, metal halide lamp, a divergent continuous-wave laser, a flash lamp, or even a pulsed laser. It is preferable in a visible embodiment of a VAOSP that the visible lamp chosen for the radiation source 12 emit continuously over the desired visible VAOSP output spectral range of approximately 0.4–0.7, $\mu$m.

The second component of a generic VAOSP 10 is a low emissivity entrance slit 14. The terms "low emissivity entrance slit" and "entrance slit" are interchangeable as used hereinafter. The lower limit on entrance slit width $d_e$ is selected just large enough to prevent diffraction at the longest wavelength of incident light, i.e., the width equals the diffraction limit at the long wavelength of the radiation source 12. The upper limit on the entrance slit width is a function of spectral resolution. By increasing slit width, the resolution degrades (meaning the bandwidth of a resolution element goes up). Conversely, by reducing slit width, output power is reduced. There is a direct trade-off between resolution and output power.

The third component of a generic VAOSP 10 is an input collimating element 16, comprising either a lens 16 or mirror 16 located one focal length, $L_F$, away from the entrance slit 14. The choice of a lens or a mirror for a collimating element is not critical to the invention. Lenses tend to make the optical layout of a VAOSP simpler, but mirrors generally offer better spectral throughput. Achromatic lens elements may also be used as a collimating element in accordance with this invention for improved resolution performance. The purpose of the input collimating element 16 is to collimate (to make parallel) the diverging broadband light emerging from the entrance slit 14.

Figure 2A:
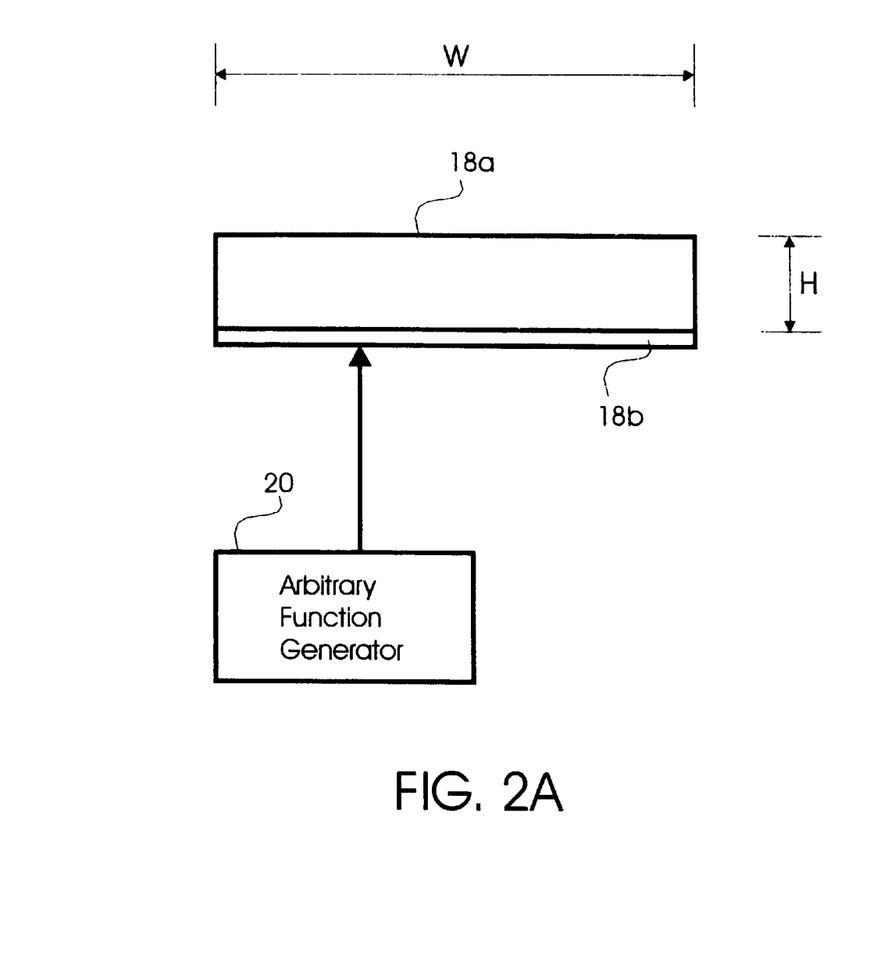
FIGS. 2A and 2B are front and top views, respectively, of a Bragg cell in accordance with this invention.
Figure 2B:
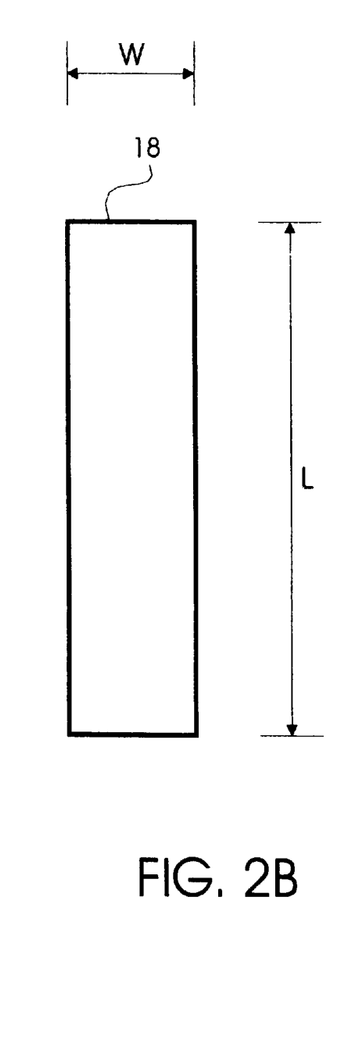

The fourth component of a generic VAOSP 10 is a Bragg cell 18 with an entrance face located about one focal length, $L_F$, away from the input collimating element 16. Referring to FIGS. 2A and 2B, a front view and a top view, respectively, of a Bragg cell 18 are shown. A Bragg cell 18 is an acousto-optical device comprising a block of crystalline material 18a with a piezoelectric transducer 18b attached to a surface. The terms "block of crystalline material", "crystalline material" and "crystal" will be used interchangeably hereinafter. The dimensions of the crystal are categorized as height, H, width, W, and length, L. TABLE 1 below, is an inexhaustive list of materials and parameters of the materials suitable for the crystal of a Bragg cell 18 in accordance with this invention.

TABLE 1

Acousto-optic properties of crystal materials for a VAOSP Bragg cell

| Crystal Material | Spectral Range ($\mu$m) | Acoustic Velocity, v (mm/$\mu$s) | $\Delta f$, $f_c$ (MHZ) | $M_2$ ($\mu m^2$/kW) | Active Area, H × W (mm × mm) | Resolution, N (points) | Optical Polariz. |
|---|---|---|---|---|---|---|---|
| $TeO_2$ (shear) | 0.4–5.0 | 0.62 | 60, 130 | 1000 | 1 × 15 | 793 | Circular |
| GaP | 0.6–9.0 | 6.3 | 200, 400 | 44 | 0.75 × 13 | 338 | Linear |
| Ge | 2.0–11.5 | 5.5 | 30, 70 | 180 | 1.5 × 25 | 111 | Linear |
| $Tl_3AsSe_3$ | 2.0–12.0 | 1.05 | 10, 23.7 | 460 | 3 × 15 | 117 | Linear |
| $TlGaSe_2$ | 0.6–20.0 | 1.05 | 10, 25 | 406 | 3 × 15 | 117 | Linear |
| $Tl_3AsS_4$ | 0.6–12.0 | 1.21 | 10, 25 | 815 | 3 × 15 | 102 | Linear |

These crystalline materials work in spectral ranges as indicated in Table 1. Optical bands of interest include: long wave infrared (LWIR), which includes wavelengths ranging approximately 7–11 $\mu$m, medium-wave infrared (MWIR), which includes wavelengths ranging approximately 3–5 $\mu$m, and visible, which includes wavelengths ranging approximately 0.4–0.8 $\mu$m. The crystalline material parameters that have the greatest impact on the resolution of the VAOSP are the acoustic velocity (slower is better) and the frequency bandwidth (larger is better).

Crystal dimensions, H, L, and W are typically defined by the manufacturer of the crystal. The length, L, affects efficiency, $\eta$, as shown in EQ. (7) and (8). Referring to FIG. 2A, a front view of a Bragg cell 18 in accordance with this invention is illustrated. Light from collimating element 16 travels along a path into the face or active area 19 of the crystal 18a. It is preferable to select a crystal with the largest active area 19 (H×W dimension) available. The larger the active area 19, the better the spectral resolution. Crystals of H×W dimension 3 mm×15 mm are presently available. The difficulty with larger active area dimensions is that it becomes more difficult for the acoustic and light waves to constantly meet the Bragg condition over greater widths. Furthermore, larger apertures require more radio frequency (RF) power to operate. Higher RF power implies the need for greater heat dissipation to avoid damaging the crystal.

The piezoelectric transducer 18b is driven by an arbitrary function generator 20. The piezoelectric transducer 18b is of a conventional material and attached to a side of the crystal 18a in a manner within the scope of knowledge of a person of ordinary skill in the art, and thus, will not be further detailed here. The Bragg cell 18 is located at the Fourier plane (one focal length away from the collimating element 16.

Referring to FIG. 2B, a top view of a Bragg cell 18 in accordance with this invention is illustrated. Light 21 enters the crystal 18a from the face of the active area 19 at the Bragg angle $\theta_B$ and travels within the crystal 18a. The Bragg angle $\theta_B$ is measured from a normal 23 to the crystal 18a. When the piezoelectric transducer 18b is driven by the arbitrary function generator 20, acoustic waves in the crystal 18a diffract the light 21.

A necessary condition for a VAOSP is that all separately resolvable wavelengths, for a unique and specific frequency, $f$, exit the Bragg cell at the same angle. This enables all wavelength components to be focused with an element 22 to pass through a single exit slit 24 and then to uniformly fill the aperture of an output collimating element 26. Mathematically, this means $$\lambda f = \text{constant}, \tag{14}$$

EQ. (14) makes it possible to meet the Bragg condition for different wavelengths of light from one input angle, $\theta_B$, and one output angle, solely by changing the RF frequency. If the entrance and exit slits are at positions defined by these angles and at one focal length, $L_F$, away from their respective collimating elements, the wavelength of light passing through the exit slit is proportional to the drive frequency of the arbitrary function generator.

Referring back to FIG. 1, the fifth component of a generic VAOSP 10 is an arbitrary function generator 20 to provide electronic control of an arbitrary RF signal which drives the transducer 18b of the Bragg cell 18 at an arbitrary drive frequency, $f$.

The electrical connection between the arbitrary function generator 20 and the transducer 18b of the Bragg cell is not shown in FIG. 1 for clarity and may be accomplished by any means known to one of ordinary skill in the art. Transducer 18b is not shown in FIG. 1, but it is shown schematically in FIG. 2A. Transducer 18b is conventional in nature, and thus, will not be further discussed.

The sixth component of a generic VAOSP 10 is an output optical element 22, which can be either a lens 22 or mirror 22. The terms "output optical element" and "reimaging optical element" will be used interchangeably hereinafter. The output optical element 22 is also located at the Fourier plane, i.e., one focal length from the center of the Bragg cell 18.

The seventh component is an exit slit 24 located one focal length away from the output optical element 22. The exit slit width, $d_x$, is selected to be just large enough to accommodate the spot size of the largest output wavelength of the particular VAOSP 10 embodiment. The diffraction limited optical spot diameter, $d_o$, which is also the width in the dispersion direction, is defined by the Raleigh criterion as:

$$d_0 = \frac{2.44 L_F \lambda}{W}, \tag{15}$$

where $L_F$ is the focal length, $\lambda$ is the wavelength of incident light, and W is the width of the Bragg crystal. So, $d_x = d_{o,max} = 2.44 L_F \lambda_{max}/W$. The resolution $\delta\lambda$, which satisfies the Raleigh criterion is given by setting the spatial separation of adjacent resolution elements at the exit slit plane, $d_d$, equal to half of the spot size, $d_o$:

$$d_d = \delta\theta L_F = \frac{d_o}{2} = \frac{1.22 L_F \lambda}{W} = \frac{L_F \delta \lambda f}{v}, \tag{16}$$

Rearranging EQ. (16), $\delta\lambda$ can be expressed as follows:

$$\delta\lambda = \frac{1.22 v \lambda}{fW}, \tag{17}$$

The inverse dependence of $\delta\lambda$ on the crystal width, W, and frequency, $f$, means that to improve resolution (decrease $\delta\lambda$), W and $f$ must increase. Likewise, $v$ should decrease. The average spectral resolution, $\delta\lambda_{avg}$, is:

$$\delta\lambda_{avg} = \frac{\Delta\lambda}{N}, \tag{18}$$

All of these parameters depend on the acousto-optic crystal material and the configuration of the Bragg cell. There is little room for design optimization other than choosing the Bragg cell that leads to the lowest $\delta\lambda$.

The eighth element of a generic VAOSP 10 is an output collimating element 26, which can be a lens 26 or a mirror 26. The output collimating element 26 provides the output of the VAOSP 10: time-varying, spectrally-varying light. An expression for spectral resolution in terms of wavenumbers, $v$, is:

$$\delta v \, (\text{cm}^{-1}) = \frac{\delta\lambda 10^4}{\lambda^2}, \tag{19}$$

which provides another measure of system resolution, where $\delta\lambda$ and $\lambda$ are in microns ($\mu$m).

The focal length, $L_F$, of the output optical element 22 should be chosen such that the output f-number (F/#=$L_F$/W) is small enough to produce a solid angle of light large enough to almost fill the acceptance cone of the output collimating lens 26. The F/# of this lens 26 should be smaller than that of the light passing through the exit slit 24, so the output solid angle, $\Omega$, passing through the slit and collected by lens 26 equals that from element 22 (and W). The focal length of element 26 should be chosen to make the A$\Omega$ product of the VAOSP, where A is the area, greater than or equal to the A$\Omega$ product of the sensor. The A to use in this equation is the focal length, $L_F$, of element 26 times the field of view of the sensor, quantity squared. The $\Omega$ is that from the exit lens: $\Omega = \pi/(4(F/\#)^2 + 1)$.

Having described the basic components of a generic VAOSP, specific embodiments based on the above components and observations are disclosed below.

LWIR Embodiment of a VAOSP

A first embodiment of a VAOSP to be described is a long-wave infrared (LWIR) device that emits light in the 7 to 11 $\mu$m range. The radiation source 12 is a small blackbody behind a low emissivity entrance slit 14. A lens 16 located one focal length, $L_F$=50 mm (chosen to have the F/#=3.3) away from the entrance slit 14 collimates the infrared light passing through the entrance slit 14 and directs the infrared light on to the front (active area) of a Bragg cell 18. The Bragg cell 18 comprises $Tl_3AsSe_3$ crystalline material with dimensions H=3 mm, W=15 mm, and L=55 mm. Larger H×W active area dimensions would be preferable, but this is the largest $Tl_3AsSe_3$ Bragg cell known to the inventor which is currently available. The $Tl_3AsSe_3$ crystal may be operated in approximately the 20 to 30 MHz range, with a center frequency, $f_c$, of 23.7 MHz. A $Tl_3AsSe_3$ crystal satisfies EQ. (14), as well as the Bragg condition, EQ. (5), when $$\lambda f = 7 \, \mu m(30.4 \, MHz) = 9 \, \mu m(23.7 \, MHz) = 11 \, \mu m(19.3 \, MHz) = 213 \, \mu m/\mu s, \quad (20)$$

As will be shown below, the spectral resolution, EQ. (19), of this device is less than 7 cm$^{-1}$ at all wavelengths from 7–11 $\mu$m.

The generic VAOSP 10 of FIG. 1 may be employed to illustrate a ray trace diagram of an LWIR embodiment of a VAOSP. The radiation source 12 is a blackbody. The blackbody light passes through the entrance slit 14 and is collimated by a collimating lens 16. The collimated light passes through the Bragg Cell 18 at an angle, $\theta_B$, chosen to satisfy the Bragg condition, $f\lambda = 2v\theta_B$, from EQ. (9), at the maximum number of RF frequencies and optical wavelengths. For 20 MHZ<$f$<30 MHZ and 7<$\lambda$<11, the optimum Bragg angle, $\theta_B = 5.8° = 101$ mrad. Given the above crystal dimensions we can solve for the predicted resolution of the system using EQ. (12), $$N = \frac{(15 \, mm)(10 \, MHz)}{1.22(1.05 \, \mu m/\mu s)} = 117 \, \text{points}, \quad (21)$$

This corresponds to an average spectral resolution of:

$$\delta\lambda_{avg} = \frac{(11-7) \, \mu m}{117 \, \text{points}} = 34 \, nm/\text{point}, \quad (22)$$

using EQ. (19). Actual resolution will be less, i.e., more nm/point, than this because a fixed slit width is used for all wavelengths, and diffraction limited spot size increases with wavelength.

Actual resolution of the LWIR embodiment of a VAOSP depends on the diffraction limit of the optical system and the separation angle between adjacent wavelength resolution elements, effects which compete against one another. For a Bragg Cell width of W=15 mm, optical spot size at the exit slit 24 is inversely proportional to the focal length, $L_F$, of the reimaging optical element 22. Conversely, the $L_F$ must be chosen long enough to have the individual resolution elements correspond to the exit slit width, $d_x$, while such a long $L_F$ causes the minimum spot size to increase relative to the slit. As will be shown next, this tradeoff comes down to sacrificing spectral resolution for signal and solid angle.

The exit slit width, $d_x$, should be large enough to just accommodate the spot size at the maximum wavelength, 11 $\mu$m. So, for a lens with $L_F=50$ mm, we can solve for the diffraction limited optical spot diameter, $d_o$, using EQ. (14):

$$d_{o,max} = \frac{2.44(50 \, mm)(11 \, \mu m)}{15 \, mm} = 89.5 \, \mu m, \quad (23)$$

in the dispersion direction. (In the orthogonal direction the size will be much larger). Thus, an exit slit width, $d_x=90$ to 100 $\mu$m is appropriate. For the calculations below we will choose $d_x=100 \, \mu m$. The resolution $\delta\lambda$ which satisfies the Rayleigh criterion is given by setting the spatial separation of adjacent resolution elements, at the exit slit plane equal to half the exit slit width, i.e., $d_d=50 \, \mu m$. Using EQS. (16) and (20) we can solve for $\delta\lambda$:

$$\delta\lambda = \frac{d_{o,max} v}{2L_F f} = \frac{d_x v \lambda}{426 L_F} = \frac{100(1.05)\lambda}{426(50)} = \frac{\lambda}{203}, \quad (24)$$

Thus, the spectral resolution, $\delta\lambda = 54$ nm at $\lambda = 11 \, \mu m$, $\Delta\lambda = 44$ nm at $\lambda = 9 \, \mu m$, and $\Delta\lambda = 35$ nm at $\lambda = 7 \, \mu m$.

Figure 3:
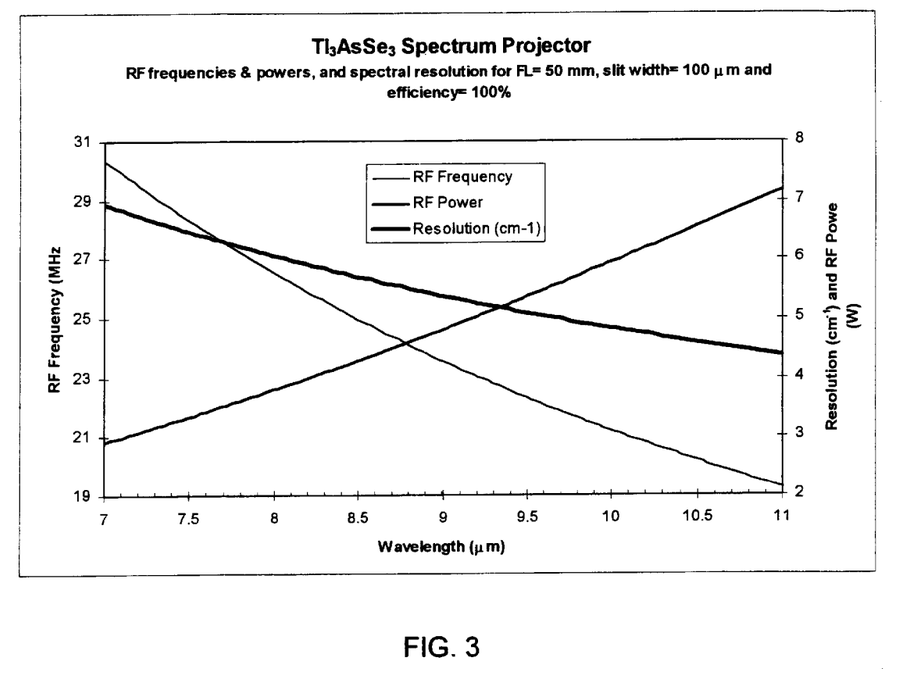
FIG. 3 is a graph of frequency, power and resolution versus wavelength for an embodiment of a variable acousto-optic spectrum projector with a Bragg cell including a $Tl_3AsSe_3$ crystal in accordance with this invention.

FIG. 3 graphically displays RF frequency, RF power and spectral resolution as a function of wavelength over the LWIR frequency band for an LWIR embodiment of VAOSP with the parameters discussed above. The spectral resolution, $\delta v$, is plotted along with the necessary RF frequency for each output wavelength. The spectral resolution ranges from about $350/7^2 = 7$ cm$^{-1}$ at 7 $\mu$m to $540/11^2 = 4.5$ cm$^{-1}$ at 11 $\mu$m, with the central resolution (at 9 $\mu$m) is $440/9^2 = 5.5$ cm$^{-1}$, from EQ. (20).

FIG. 3 shows the RF power required to produce a constant diffraction efficiency of 100%, for instance, for all wavelengths from 7 to 11 $\mu$m. One can calculate the diffraction efficiency, $\eta$, using EQ. (7). And from EQ. (8), $\eta$ is maximum at 9 $\mu$m when $$P = \frac{(3 \, mm)(9 \, \mu m)^2}{2(55 \, mm)(460 \, \mu m^2/kW)} = 4.8W, \quad (25)$$

Using EQ. (7), at $\lambda = 9 \, \mu m$, the power, P, for an efficiency of 60% is reduced to 1.52 W. Because the optical polarization for a $Tl_3AsSe_3$ crystal is linear (see Table 1), only half of the input optical power from a randomly polarized source will be diffracted with an efficiency as defined in EQ. (7). For this reason, a 600 K blackbody is needed to produce an apparent temperature of about 300 K at 11 $\mu$m. The focal length of the input collimating lens should be 50 mm and the entrance slit width, $d_e$, should be 100 $\mu$m, as with the exit lens focal length, $L_F$ and exit slit width, $d_x$. The input angle separation is half that of the exit angle, so two wavelength resolution elements will be collected at the Bragg angle, $\theta_B$ by one RF frequency, but only the correct one will make it through the exit slit. Therefore, the entrance slit width, $d_e$, must be over 50 $\mu$m, and should be at least 100 $\mu$m to accommodate the 11 $\mu$m spot sizes. Extending entrance slit width, $d_e$, beyond 100 $\mu$m will raise the spectral resolution, $\delta\lambda$.

As stated previously, the optical system following the Bragg Cell includes a reimaging lens or mirror 22 and a 100 $\mu$m exit slit 24. The reimaging element 22 will have the same focal length as the input collimating element 16, i.e., $L_F=50$ mm, so the output f-number is also 3.3. An output collimating lens 26 follows the exit slit 24. The properties of the output collimating element 26 generally depend on the application for which the VAOSP is intended to be used.

For a sensor with a 1" aperture, for instance, the output collimating element 26 should be larger than 1" in diameter and its focal length should be chosen so that the sensor's field of view encompasses the whole exit slit 24. The focal length required to fill a 1.2" aperture with an F/3.3 cone of light is 100 mm. This would allow a sensor with a field of view (FOV) of 25 mrad, for instance, to see a region 2.5 mm in diameter at the exit slit 24. To make use of this FOV, background signal can be added by tilting the exit slit 24 and reflecting light from another blackbody source (15° C.<T<200° C.) off the exit slit back surface.

Alternatively, the exit slit 24 can be made from a linear array of 100 $\mu$m core diameter LWIR optical fibers. Then, light from the blackbody can also be added with another array of optical fibers. The output ends of both arrays of fibers are then placed at the focal plane of the output lens 26. One disadvantage of the slit system is that the percentage of the FOV filled by the spectrally varying source is only (4/π)0.1/2.5=5%, assuming the slit width and source heights are both 2.5 mm. signal strength is somewhat limited by such a system, but the spectral resolution is good and the system is relatively inexpensive because a small source can be used.

Visible Band Embodiment of a VAOSP

Figure 4:
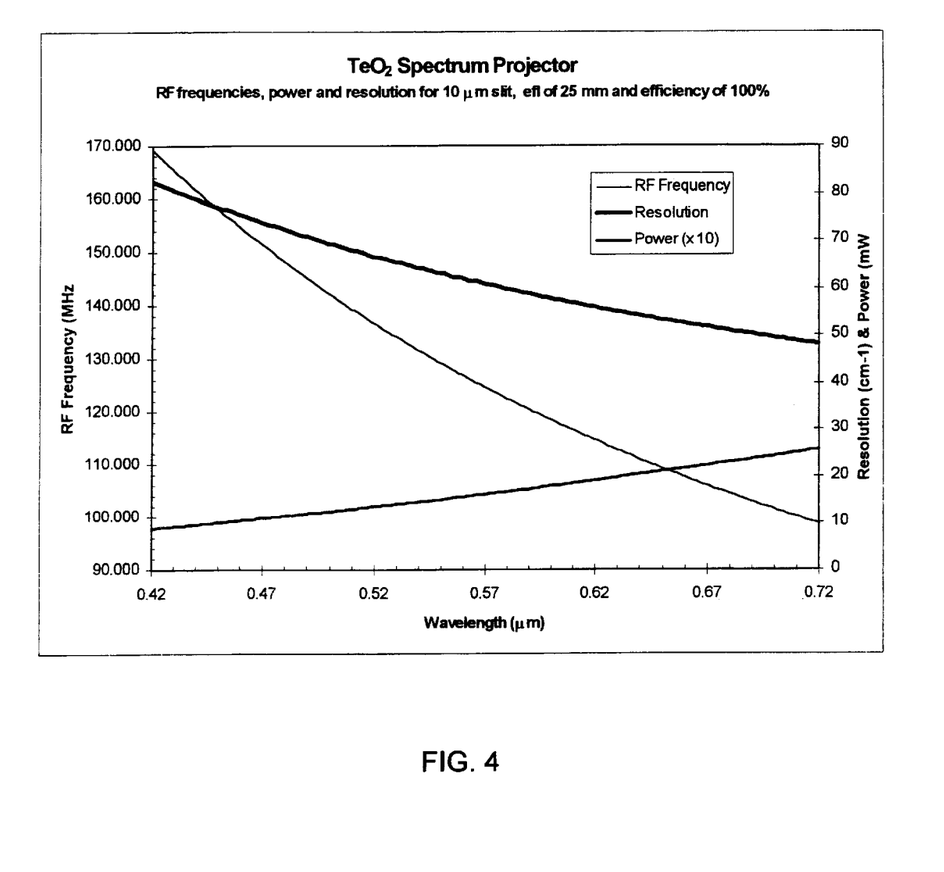
FIG. 4 is a graph of frequency, power and resolution versus wavelength for an embodiment of a variable acousto-optic spectrum projector with a Bragg cell including a $TeO_2$ crystal in accordance with this invention.

A visible VAOSP can be constructed in the same manner as described for the LWIR VAOSP. The dimensional parameters of all of the components will be different, but the principle of operation will be the same. The most preferable Bragg Cell material to use for the visible spectrum projector, at this time, is $TeO_2$ because it has a very low acoustic velocity, v. The RF frequencies required of the arbitrary function generator 20 will be in the 100 to 160 MHZ range. FIG. 4 is a graph of the spectral resolution, RF power (multiplied by 10) and RF frequencies for an 80 to 50 $cm^{-1}$ (1.4 to 2.6 nm) spectral resolution VAOSP in the 420 to 720 nm range. The fλ product equals 71 μm/μs for a Bragg angle, $θ_B$=3.3°. The required RF power levels range from 0.8 to 2.5 mW—less than with the LWIR embodiment because of the $λ^2$ dependence.

The F/# of the optical system needed for this Bragg cell is lower than in the IR embodiment because the angular separation between adjacent resolution elements is smaller, so the slit width must be only 10 μm. To maximize the spectrally varying fill factor, especially for the small slit, the solid angle of the optics should be as large as possible. The focal length of the input collimating element 16 and output optical element 22 is $F_L$=25 mm, making the F/#=1.67. AF/1.67 output collimating lens 26 (after the exit slit 24) with a 1.2" diameter will need a focal length, $F_L$=50 mm, so the fill factor of a detector with a 25 mrad diameter field of view for a 10 μm slit is only (4/π)0.01/(0.025*50)=1% (the detector will see an area 1.27 mm in diameter at the exit slit 24).

Although this invention has been described with reference to particular embodiments, the invention is not limited to these described embodiments. Rather, it should be understood that the embodiments described herein are merely exemplary and that a person skilled in the art may make many variations and modifications without departing from the spirit and scope of the invention. For example, to the extent that the functions of the above components can be collapsed into fewer components performing the same function, such modification is considered to be within the scope of the invention. Furthermore, all such variations and modifications are intended to be included within the scope of the invention as defined in the appended claims.

What is claimed is:

1. A spectrum projector comprising:
a radiation source for emitting broadband electromagnetic radiation; input optics optically coupled to said radiation source for receiving at least a portion of said broadband electromagnetic radiation and transmitting collimated radiation;
a Bragg cell optically coupled to said input optics for receiving said collimated radiation and dynamically diffracting said collimated radiation to output modulated radiation; and
output optics optically coupled to said Bragg cell for receiving said modulated radiation and projecting collimated, time-varying, spectrally-varying radiation.

2. The spectrum projector of claim 1, wherein said radiation source includes an infrared spectrum blackbody.

3. The spectrum projector of claim 1, wherein said radiation source includes a broadband infrared spectrum laser.

4. The spectrum projector of claim 1, wherein said radiation source includes a visible spectrum lamp.

5. The spectrum projector of claim 1, wherein said radiation source includes a broadband visible spectrum laser.

6. The spectrum projector of claim 1, wherein said input optics further comprises:
an entrance slit proximate to said radiation source for receiving and transmitting said at least a portion of said broadband electromagnetic radiation; and
an input collimating element located one focal length from said entrance slit for receiving said at least a portion of said radiation from said entrance slit and transmitting said collimated radiation.

7. The spectrum projector of claim 1, wherein said Bragg cell further comprises:
a block of acousto-optic crystalline material having an active area surface, an exit surface, and a transducer surface for receiving said collimated radiation on said active area surface at an input Bragg angle, wherein said input Bragg angle is measured from a perpendicular to said active area surface;
a piezoelectric transducer operably coupled to said transducer surface of said block of acousto-optic crystalline material for propagating acoustic pressure waves therein; and
an arbitrary function generator operably coupled to said transducer for inputting an electrical signal to drive said piezoelectric transducer.

8. The spectrum projector of claim 7, wherein said block of acousto-optic crystalline material is selected from the group consisting of $TeO_2$, GaP, Ge, $Tl_3AsSe_3$, $TlGaSe_2$ and $Tl_3AsS_4$.

9. The spectrum projector of claim 1, wherein said output optics further comprises:
an output optical element located one focal length from said Bragg cell for receiving said modulated radiation transmitted by said Bragg cell and focusing said modulated radiation;
an exit slit located one focal length from said output optical element for receiving said focused modulated radiation and transmitting time-varying, spectrally-varying radiation; and
an output collimating element located one focal length from said exit slit for receiving said time-varying, spectrally-varying radiation transmitted by said exit slit and projecting said collimated time-varying, spectrally-varying radiation.

10. A spectrum projector comprising:
a radiation source for emitting broadband electromagnetic radiation, wherein said radiation source is selected from the group consisting of infrared spectrum blackbody, broadband infrared spectrum laser, visible spectrum lamp and broadband visible spectrum laser;
input optics optically coupled to said radiation source for receiving at least a portion of said broadband electromagnetic radiation and transmitting collimated radiation;
a Bragg cell optically coupled to said input optics for receiving said collimated radiation and dynamically diffracting said collimated radiation to output modulated radiation; and
output optics optically coupled to said Bragg cell for receiving said modulated radiation and projecting collimated, time-varying, spectrally-varying radiation.

11. The spectrum projector of claim 10, wherein said input optics further comprises:
   an entrance slit proximate to said radiation source for receiving and transmitting said at least a portion of said broadband electromagnetic radiation; and
   an input collimating element located one focal length from said entrance slit for receiving and collimating radiation from said entrance slit and transmitting said collimated radiation.

12. The spectrum projector of claim 10, wherein said Bragg cell further comprises:
   a block of acousto-optic crystalline material having an active area surface, an exit surface, and a transducer surface for receiving said collimated radiation on said active area surface at an input Bragg angle, wherein said input Bragg angle is measured from a perpendicular to said active area surface;
   a piezoelectric transducer operably coupled to said transducer surface of said block of acousto-optic crystalline material for propagating acoustic pressure waves therein; and
   an arbitrary function generator operably coupled to said transducer for inputting an electrical signal to drive said piezoelectric transducer.

13. The spectrum projector of claim 12, wherein said block of acousto-optic crystalline material is selected from the group consisting of $TeO_2$, GaP, Ge, $Tl_3AsSe_3$, $TlGaSe_2$ and $Tl_3AsS_4$.

14. The spectrum projector of claim 10, wherein said output optics further comprises:
   an output optical element located one focal length from said Bragg cell for receiving said modulated radiation transmitted by said Bragg cell and focusing said modulated radiation;
   an exit slit located one focal length from said output optical element for receiving said focused modulated radiation and transmitting time-varying, spectrally-varying radiation; and
   an output collimating element located one focal length from said exit slit for receiving said time-varying, spectrally-varying radiation transmitted by said exit slit and projecting said collimated time-varying, spectrally-varying radiation.

15. A long-wave infrared (LWIR) variable acousto-optic spectrum projector (VAOSP) comprising:
   a radiation source for emitting continuous-wave electromagnetic radiation in the spectral range from about 6 $\mu$m to about 12 $\mu$m;
   an entrance slit optically coupled to said radiation source for receiving and transmitting at least a portion of said emitted radiation;
   an input collimating element located one focal length from, and optically coupled to, said entrance slit for receiving and collimating substantially all of said radiation transmitted by said entrance slit;
   a Bragg cell located one focal length from, and optically coupled to, said input collimating element for receiving radiation collimated by said input collimating element at a Bragg angle dynamically diffracting said collimated radiation and transmitting diffracted radiation;
   an output optical element located one focal length from, and optically coupled to, said Bragg cell for receiving and focusing said diffracted radiation;
   an exit slit located one focal length from, and optically coupled to, said output optical element for receiving and transmitting at least a portion of radiation from said output optical element; and
   an output collimating element located one focal length from, and optically coupled to, said exit slit for receiving said at least a portion of radiation transmitted by said exit slit and projecting LWIR, collimated, time-varying, spectrally-varying radiation.

16. The LWIR VAOSP of claim 15, wherein said radiation source further comprises a blackbody operable in the temperature range from about 400 to 1200 Kelvin with an aperture of at least about 0.25 inches and an exit F/# less than or equal to about 3.3.

17. The LWIR VAOSP of claim 16, wherein said blackbody is operable at nominally 1000 Kelvin, with about a 0.5 inch aperture.

18. The LWIR VAOSP of claim 15, wherein said entrance slit is of width, $d_e$, wherein $d_e$ is greater than 50 $\mu$m.

19. The LWIR VAOSP of claim 15, wherein said input collimating element comprises a lens of focal length, $F_L$=50 mm.

20. The LWIR VAOSP of claim 15, wherein said Bragg cell includes $Tl_3AsSe_3$ crystal material.

21. The LWIR VAOSP of claim 15, wherein said output optical element comprises a lens of focal length, $F_L$=50 mm.

22. The LWIR VAOSP of claim 15, wherein said exit slit is of width, $d_x$, wherein $d_x$=100 $\mu$m.

23. A visible variable acousto-optic spectrum projector (VAOSP) comprising:
   a visible lamp for emitting continuous-wave electromagnetic radiation in the visible range;
   an entrance slit optically coupled to said visible lamp for receiving and transmitting at least a portion of said emitted continuous-wave electromagnetic radiation;
   an input collimating element located one focal length from, and optically coupled to, said entrance slit for receiving and collimating substantially all of said radiation transmitted by said entrance slit;
   a Bragg cell located one focal length from, and optically coupled to, said input collimating element for receiving radiation at an input Bragg angle from said input collimating element and transmitting dynamically diffracted radiation;
   an output optical element located one focal length from, and optically coupled to, said Bragg cell for receiving and focusing said dynamically diffracted radiation;
   an exit slit located one focal length from, and optically coupled to, said output optical element for receiving and transmitting at least a portion of radiation from said output optical element; and
   an output collimating element located one focal length from, and optically coupled to, said exit slit for receiving said at least a portion of radiation from said exit slit and projecting visible, collimated, time-varying, spectrally-varying radiation.

24. The visible VAOSP of claim 23, wherein said visible lamp is a high power xenon lamp.

25. The visible VAOSP of claim 23, wherein said visible lamp is a metal halide lamp.

26. The visible VAOSP of claim 23, wherein said visible lamp is a divergent continuous-wave laser.

27. The visible VAOSP of claim 23, wherein said visible lamp is a flash lamp.

28. The visible VAOSP of claim 23, wherein said visible lamp is a pulsed laser.

29. The visible VAOSP of claim 23, wherein said entrance slit is of width, $d_e$, wherein 5 $\mu$m$\leq d_e \leq$20 $\mu$m.

30. The visible VAOSP of claim 23, wherein said input collimating element and said output optical element comprise lenses of focal length, $F_L$=25 mm.

31. The visible VAOSP of claim 23, wherein said output collimating element comprises a lens of focal length, $F_L$=50 mm and diameter of about 1.2".

32. The visible VAOSP of claim 23, wherein said Bragg cell includes $TeO_2$ crystal material.

33. The visible VAOSP of claim 23, wherein said exit slit is of width, $d_x$, wherein $d_x$=10 $\mu$m.

34. A method of projecting variable acousto-optically modulated spectral radiation comprising:

emitting broadband radiation;

transmitting a portion of said broadband radiation through a first aperture;

collimating said portion of broadband radiation;

dynamically diffracting said portion of roadband radiation;

reimaging said diffracted portion of broadband radiation; and transmitting a portion of said diffracted portion of broadband radiation through a second aperture.

35. The method of claim 34, wherein said emitting broadband radiation comprises emitting long-wave infrared radiation.

36. The method of claim 34, wherein said emitting broadband radiation comprises emitting medium-wave radiation.

37. The method of claim 34, wherein said emitting broadband radiation comprises emitting visible radiation.

38. The method of claim 34, wherein said emitting broadband radiation comprises emitting ultraviolet radiation.

39. The method of claim 34, wherein said emitting broadband radiation comprises emitting near-infrared radiation.

40. The method of claim 34, further comprising collimating radiation transmitted by said second aperture.

* * * * *